US008364594B2

(12) United States Patent
Hammad

(10) Patent No.: US 8,364,594 B2
(45) Date of Patent: Jan. 29, 2013

(54) SYSTEM AND METHOD INCLUDING SECURITY PARAMETERS USED FOR GENERATION OF VERIFICATION VALUE

(75) Inventor: Ayman Hammad, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 13/038,227

(22) Filed: Mar. 1, 2011

(65) Prior Publication Data

US 2011/0225089 A1 Sep. 15, 2011

Related U.S. Application Data

(60) Provisional application No. 61/312,196, filed on Mar. 9, 2010, provisional application No. 61/323,297, filed on Apr. 12, 2010.

(51) Int. Cl.
*G06Q 40/00* (2006.01)
(52) U.S. Cl. ............................................ 705/44; 705/30
(58) Field of Classification Search ............... 705/10–44
See application file for complete search history.

(56) References Cited

U.S. PATENT DOCUMENTS

| 6,609,113 | B1 * | 8/2003 | O'Leary et al. | 705/39 |
| 7,720,756 | B2 * | 5/2010 | Kavounas | 705/39 |
| 7,761,374 | B2 * | 7/2010 | Sahota et al. | 705/39 |
| 7,810,165 | B2 * | 10/2010 | Hammad et al. | 726/36 |
| 7,877,325 | B2 * | 1/2011 | Bishop et al. | 705/39 |
| 7,899,744 | B2 * | 3/2011 | Bishop et al. | 705/39 |
| 8,121,945 | B2 * | 2/2012 | Rackley et al. | 705/40 |
| 2003/0126094 | A1 * | 7/2003 | Fisher et al. | 705/75 |
| 2005/0043997 | A1 | 2/2005 | Sahota et al. | |
| 2007/0294182 | A1 | 12/2007 | Hammad et al. | |
| 2008/0034221 | A1 * | 2/2008 | Hammad et al. | 713/190 |
| 2008/0040276 | A1 | 2/2008 | Hammad et al. | |
| 2009/0150269 | A1 * | 6/2009 | Bishop et al. | 705/30 |
| 2009/0210712 | A1 | 8/2009 | Fort | |
| 2009/0271211 | A1 * | 10/2009 | Hammad | 705/1 |
| 2009/0319430 | A1 * | 12/2009 | Faith et al. | 705/50 |
| 2010/0027786 | A1 | 2/2010 | Faith et al. | |

FOREIGN PATENT DOCUMENTS

WO 2008-027642 3/2008

OTHER PUBLICATIONS

The International Search Report for Application No. PCT/US2011/026740, dated Oct. 19, 2011, 10 pages.
The International Written Opinion for Application No. PCT/US2011/026740, dated Oct. 19, 2011, 6 pages.

* cited by examiner

*Primary Examiner* — Frantzy Poinvil
(74) *Attorney, Agent, or Firm* — Kilpatrick Townsend & Stockton LLP

(57) ABSTRACT

Systems and methods for generating a dynamic verification value for electronic payment transactions are disclosed. The dynamic verification value is generated via a function-based algorithm that accepts a plurality of security values as input. By selecting a set of security values from the plurality of the available security values, the level of complexity and security of the dynamic verification value can be adjusted and a unique security characteristic for the dynamic verification value is obtained. Also, the issuers of portable consumer devices are able to regenerate the dynamic verification value by inputting an issuer secret phrase into the same type of function-based algorithm that was used originally to generate the dynamic verification value.

26 Claims, 7 Drawing Sheets

SYSTEM AND METHOD INCLUDING SECURITY PARAMETERS USED FOR GENERATION OF VERIFICATION VALUE

CROSS-REFERENCES TO RELATED APPLICATIONS

This Non-provisional application claims priority from the provisional patent application No. 61/312,196, filed on Mar. 9, 2010, entitled "System and Method Including Dynamic Card Verification Value," and from the provisional patent application No. 61/323,297, filed on Apr. 12, 2010, entitled "System and Method for Using Julian Date," which are incorporated herein by reference in their entirety for all purposes.

BACKGROUND

There is a need for more secure data transfer when paying for goods and services using payment cards such as debit and credit cards.

In a typical payment transaction, a user may use a credit card to purchase an item at a merchant or enter his account information into a payment page of a merchant's website. The merchant then generates an authorization request message using a POS (point of sale) terminal when the user is present at the merchant location. Alternatively, for an online transaction, the merchant website may generate an authorization request message for card-not-present (CNP) transactions. In either instance, the authorization request message is passed to the issuer of the credit card, and the issuer may approve or deny the request to authorize the transaction.

There are a variety of methods by which fraudsters attempt to obtain account information of users for conducting fraudulent transactions. To address this problem, there is a need for making electronic transactions partially dependent on data that are not part of the account information stored in a user's debit or credit card, or part of information that are typically provided by a user to a payment page of a merchant's website.

Embodiments of the invention address these and other problems, individually and collectively.

BRIEF SUMMARY

Embodiments of the invention disclosed herein include systems and methods for generating dynamic verification values for use in the electronic payment transactions.

One embodiment of the invention is directed to receiving a request for a dynamic verification value at a server computer from a user communication device through a network connection, selecting a set of security values from a plurality of security values, generating a dynamic verification value using a function-based algorithm and the security values, sending the dynamic verification value to a user communication device, and sending the dynamic verification value to a server computer. The server computer uses the dynamic verification value for authentication of a portable consumer device. The dynamic verification value is used as part of an authorization request message for performing an electronic payment transaction.

Another embodiment of the invention is directed to obtaining a unique security characteristic for the dynamic verification value by selecting a set of security values from the plurality of the security values.

Another embodiment of the invention is directed to adjusting the level of complexity of the dynamic verification value by selecting a set of security values from the plurality of the security values Another embodiment of the invention is directed to receiving an authorization request message, and regenerating a dynamic verification value accompanying the authorization request message by using a function-based algorithm and an issuer secret phrase. The dynamic verification value is generated by a server computer in communication with a payment processing network and supplied to a user communication device so that the dynamic verification value is embedded in the authorization request message.

These and other embodiments of the invention are described in further detail below.

DETAILED DESCRIPTION

Figure 1:
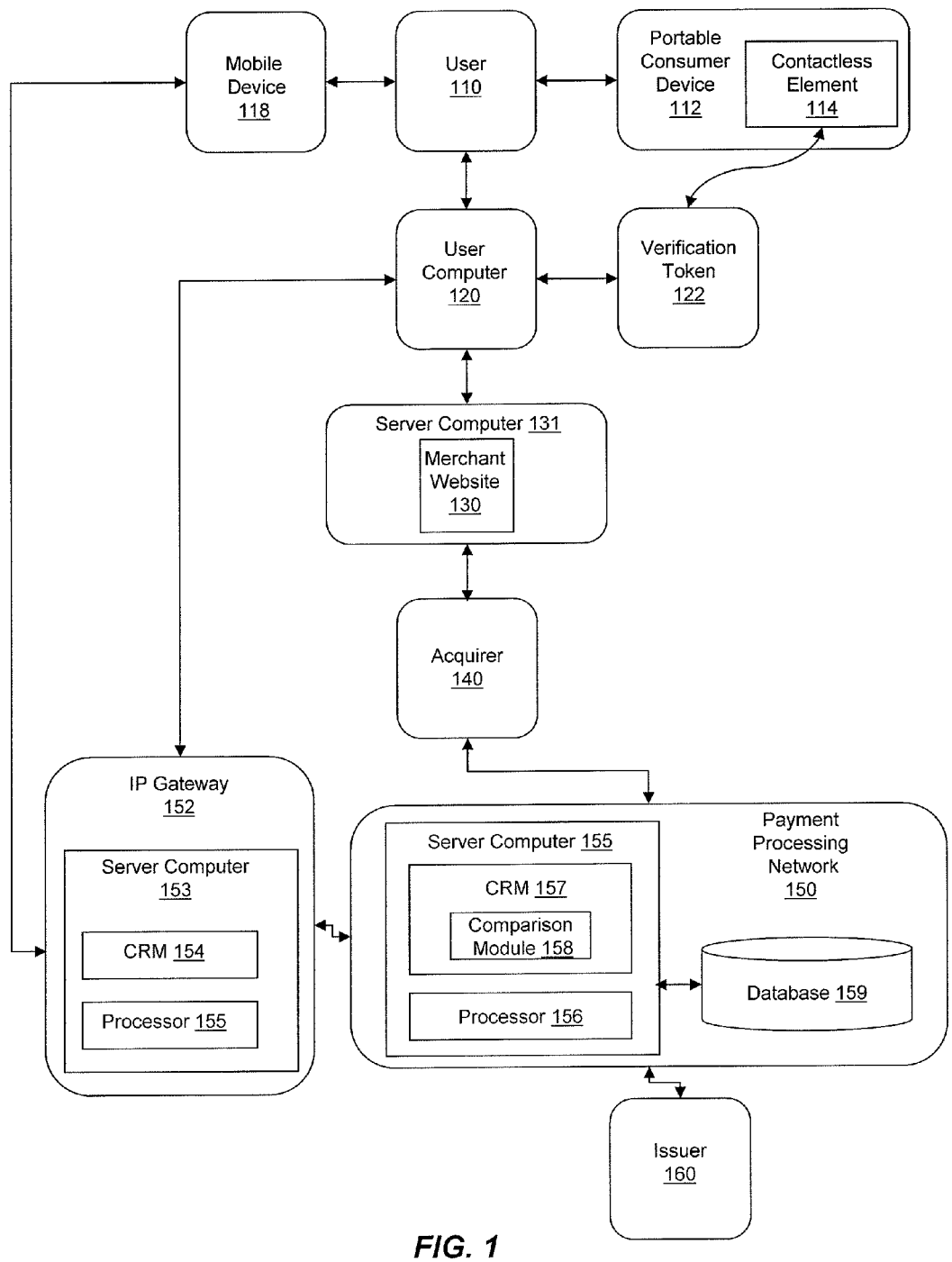
FIG. 1 shows a system according to an embodiment of the invention.

In order to provide more security for electronic transactions, data that are not part of the account information and stored in a user's debit or credit card, and that are not readily available may be used during the processing of electronic transactions. Such data can be generated by an external source and introduced into the transaction process at any point, and then verified by a processing entity or the issuer of the debit or credit card to make sure that the transaction has originated from an authorized source.

Embodiments of the invention disclosed herein include systems and methods for dynamically generating a verification value and for utilizing such value to verify that the transaction originates from an authorized source and that the portable consumer device (e.g., debit or credit card) used to conduct the transaction is authentic. The dynamically generated device verification value (also referred to as the dynamic card verification value or "dCVV2") can be embedded into the payment data.

Embodiments of the invention disclosed herein also include systems and methods for generating the dynamic verification value by employing a variety of security values that advantageously provide the ability for entities involved in the processing of the transaction to independently regenerate the dynamic verification value while maintaining the desired level of complexity and security.

In the embodiments of the invention, the dynamic verification value may be generated via a function-based algorithm that can accept one or more security values as input and generate a result from which a dynamic verification value is produced. One or more of the security values may be provided by an entity involved in processing of the electronic transaction (e.g. issuer of debit or credit cards). This allows the entity to independently regenerate and verify the dynamic verification value. In some embodiments, issuers of debit or credit cards may provide an issuer secret phrase to the entity that generates the dynamic verification values. This advantageously results in different dynamic verification values for each issuer and allows the issuers to independently regenerate and verify the dynamic verification values.

For example, a first issuer may use "1234" as the issuer secret phrase and a second issuer may use "5678" as the issuer secret phrase. As a result, different sets of dynamic verification values are generated for each of the issuers. Moreover, the entity that generates the dynamic verification values may provide the function-based algorithm to the issuers so that they can independently regenerate and verify the dynamic verification values.

Embodiments of the present invention are able to maintain or improve existing user experiences, minimize the impact on merchant processes/systems, leverage existing network data transport mechanisms, utilize existing issuer validation infrastructure, support multiple forms of implementation, and maintain consistency with broader authentication strategy.

In the embodiments of the invention, a request for a dynamic verification value is received at a server computer from a user communication device (e.g. a mobile phone or a verification token which is described later) through a secure network connection. Thereafter, a set of security values are selected from a list of available security values. A dynamic verification value is then generated by using a function-based algorithm that uses the selected set of security values as inputs. When the dynamic verification value is generated, it may be sent to the user communication device. The dynamic verification value may then be included in an authorization request message for performing an electronic payment transaction. The dynamic verification value may be sent to a server computer (associated with a payment processing network). It may then use the dynamic verification value to authentication of the portable consumer device used by a user to perform the electronic payment transaction. Further details regarding this process flow, can be found in U.S. patent application Ser. No. 12/712,148, filed on Feb. 24, 2010, U.S. Provisional Application No. 61/258,194, filed on Nov. 4, 2009, and U.S. Provisional Application No. 61/241,367, filed on Sep. 10, 2009 which are herein incorporated by reference in their entirety for all purposes.

In the embodiments of the invention, selecting a set of security values from the list of available security values, advantageously results in a dynamic verification value with unique security characteristics. Embodiments of the invention can also provide for the capability to adjust the level of complexity of the dynamic verification value.

In some embodiments, the function that generates the dynamic verification value may be a one-way function-based algorithm capable of accepting one or more security values as input. The dynamic verification value that is generated may be a 3-digit numerical value.

In the embodiments of the invention, issuers of portable consumer devices (e.g. credit and debit cards) are able to independently verify the accuracy of the dynamic verification value that they receive along with an authorization request message. In these embodiments, issuers receive an authorization request message and regenerate a dynamic verification value accompanying the authorization request message by using a function-based algorithm and an issuer secret phrase. The dynamic verification value that the issuers receive is generated by the server computer that supplied the dynamic verification value to the user communication device as it is in the authorization request message. The issuer utilizes the same type of function-based algorithm and inputs the same security values (including the issuer secret phrase) to regenerate the dynamic verification value.

As used herein, an "authorization request message" may be a message that includes an issuer account identifier. The issuer account identifier may be a payment card account identifier associated with a payment card. The authorization request message may request that an issuer of the payment card authorize a transaction. An authorization request message according to an embodiment of the invention may comply with ISO 8583, which is a standard for systems that exchange electronic transactions made by cardholders using payment cards. In embodiments of the invention, an authorization request message may include, among other data, an account identifier, one or more account attributes, an amount of the transaction (which may be any type and form of a medium of exchange such a money or points), and identification of a merchant (e.g., a merchant verification value or a merchant ID). Typically, an authorization request message is generated by a server computer (if the transaction is an e-commerce transaction) or a Point of Sale (POS) device (if the transaction is a brick and mortar type transaction) and is sent to an issuer via a payment processing network and an acquirer.

As used herein, "user communication device" can refer to an electronic device capable of communication with other electronic devices. For example, user communication device may be a desktop computer, laptop computer, netbook computer, tablet computer (e.g. iPad), mobile phone, verification token (described in detail later) and any other electronic device that can be coupled to another electronic device either wirelessly or via a direct connection.

As used herein "dynamic verification value" (e.g., a dynamic device verification value, a dynamic card verification value, and a dCVV2 value) can refer to a value that can be used to verify that a transaction (and in some cases a portable consumer device used to conduct a transaction) is authentic. It may be a numeric or alpha-numeric value that is generated by an algorithm (e.g. encryption algorithm) that uses account data such as account identifier and account attribute as inputs.

As used herein, a "server computer" is typically a powerful computer or cluster of computers. For example, the server computer can be a large mainframe, a minicomputer cluster, or a group of servers functioning as a unit. In one example, the server computer may be a database server coupled to a Web server.

I. System

FIG. 1 shows a block diagram illustrating the components of a system according to one embodiment. FIG. 1 shows a user 110, a portable consumer device 112, a mobile device 118, a user computer 120, a verification token 122, a merchant website 130, an acquirer 140, a payment processing network 150, an IP Gateway 152, server computers 153 and 155, computer readable media 154 and 157, data processors 155 and 156, a comparison module 158, a database 159, and an issuer 160.

The user 110 can use the portable consumer device 112, the mobile device 118, and the user computer 120. The user 110 interacts with the merchant website 130 using the user computer 120. The mobile device 118, the verification token 122 and the user computer 120 are capable of communicating with the IP Gateway 152 for requesting and receiving a dynamic verification value (this process will be described in detail later). The merchant website 130 is in communication with the acquirer 140. The acquirer 140 is in communication with the issuer 160 through the payment processing network 150. The payment processing network 150 is in communication with the IP Gateway 152. The IP Gateway has access to the server computer 153 which includes a computer readable medium 154 and a processor 155. The payment processing network 150 has access to the server computer 155 and the database 159. The server computer 155 is in communication with database 159, and includes computer readable medium 15, processor 156, and comparison module 158.

The user 110 refers to an individual or organization such as a business that is capable of purchasing goods or services or making any suitable payment transaction with the merchant website 130.

The portable consumer device 112 refers to any suitable device that allows the payment transaction to be conducted with the merchant website 130. The portable consumer device 112 may be in any suitable form. For example, suitable portable consumer devices 112 can be hand-held and compact so that they can fit into a consumer's wallet and/or pocket (e.g., pocket-sized). They may include smart cards, magnetic stripe cards, keychain devices (such as the Speedpass™ commercially available from Exxon-Mobil Corp.), etc. Other examples of portable consumer devices 112 include cellular phones, personal digital assistants (PDAs), pagers, payment cards, security cards, access cards, smart media, transponders, and the like. In some cases, the portable consumer device 112 may be associated with an account of user 110 such as a bank account.

Portable consumer device 112 may include a contactless element 114 that includes a processor (not shown), an antenna (not shown), computer readable media (not shown), and one or more applications stored on the computer readable media that operate in concert to allow the portable consumer device 112 to wirelessly send its stored card data to a wireless reader. The contactless element 114 provides Near Field Communication (NFC) capability for the portable consumer device 112 such that when the portable consumer device 112 is in close proximity of a wireless reader, the wireless reader powers the contactless element 114 and collects the card data.

The mobile device 118 may be in any suitable form. For example, suitable mobile device 118 can be hand-held and compact so that they can fit into a consumer's wallet and/or pocket (e.g., pocket-sized). Some examples of the mobile device 118 include desktop or laptop computers, cellular phones, personal digital assistants (PDAs), pagers, payment cards, security cards, access cards, smart media, transponders, and the like. In some embodiments, the mobile device 118 and the portable consumer device 112 are embodied in the same device.

The user computer 120 may be a personal computer or a laptop. The user computer 120 may run an operating system such as Microsoft Windows™ and may have a suitable browser such as Internet Explorer™.

The verification token 122, also referred to as the "token" or the "verification device," is an electronic device configured to be coupled to the user computer 120 and capable of wirelessly receiving card data from the portable consumer device 112. Elements of the verification token 122 and their operation will be described later with reference to FIG. 2.

The merchant website 130 may be in the form of a website hosted by one or more server computers (e.g. server computer 131). The user 110 is capable of communicating with the merchant website 130 using the user computer 120 and/or mobile device 118.

The acquirer 140 refers to any suitable entity that has an account with a merchant associated with the merchant website 130. In some embodiments, the issuer 160 may also be the acquirer 140.

The payment processing network 150 refers to a network of suitable entities that have information related to an account associated with the portable consumer device 112. This information includes data associated with the account on the portable consumer device 112 such as profile information, data, and other suitable information. Such data may be stored in one or more databases such as the database 159 and accessible by one or more server computers such as the server computer 155.

The payment processing network 150 may have or operate a server computer and may include a database (e.g. the server computer 155 and the database 159). The database may include any hardware, software, firmware, or combination of the preceding for storing and facilitating retrieval of information. Also, the database may use any of a variety of data structures, arrangements, and compilations to store and facilitate retrieval of information. The server computer may be coupled to the database and may include any hardware, software, other logic, or combination of the preceding for servicing the requests from one or more client computers. Server computer may comprises one or more computational apparatuses and may use any of a variety of computing structures, arrangements, and compilations for servicing the requests from one or more client computers.

The payment processing network 150 may include data processing subsystems, networks, and operations used to support and deliver authorization services, exception file services, and clearing and settlement services. An exemplary payment processing network 150 may include . Networks that include VisaNet™ are able to process credit card transactions, debit card transactions, and other types of commercial transactions. VisaNet™, in particular, includes an integrated payments system (Integrated Payments system) which processes authorization requests and a Base II system which performs clearing and settlement services. The payment processing network 150 may use any suitable wired or wireless network, including the Internet.

The IP Gateway 152 can refers to an entity that includes one or more servers such as server computer 153 which include one or more computer readable mediums 154 and one or more processors 155. The IP Gateway 152 may also include one or more databases (not shown), and have access to various issuer data, transaction data and user data used to authenticate the portable consumer devices. The IP Gateway 152 also generates and delivers notifications and alert messages to various delivery channels. The IP Gateway 152 may be part of the payment processing network 150 or may be a separate entity in communication with payment processing network 150.

The databases 159 may be server computers that are capable of storing data and responding to queries from client computers. The database 159 may also be in the form of stand-alone hard drives connected to one or more server computers that retrieve the data from the database 159 as result of queries from client computers.

As used herein a "computer readable medium" or "computer readable storage medium" is typically a storage medium such a hard disk or any suitable type of data storage medium capable of storing data such as program codes.

The comparison module 158 can be a program that monitors the stream of data in an electronic payment transaction and compare various types of data in the electronic payment transaction such as the dynamic verification value with the same type of data supplied by the IP Gateway 152 or any other entity to make sure the data that are part of the electronic payment transactions are accurate and are originated from an authorized source.

The issuer 160 can be any suitable entity that may open and maintain an account associated with the portable consumer device 112 for the user 110. Some examples of issuers may be a bank, a business entity such as a retail store, or a governmental entity. In many cases, the issuer 160 may also issue the portable consumer device 112 associated with the account to the user 110.

Figure 2:
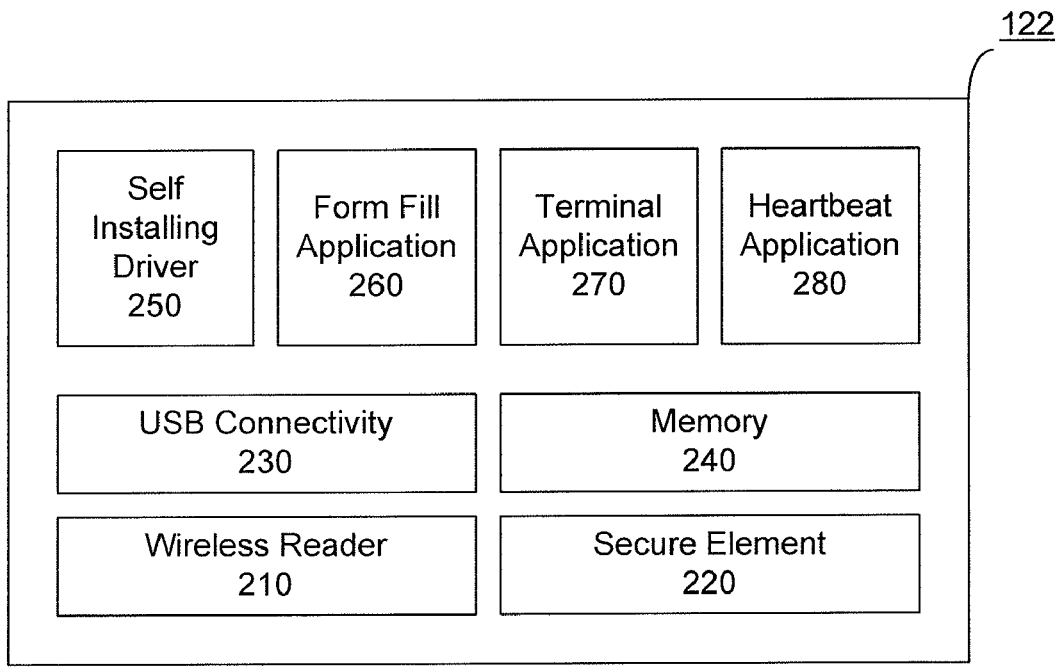
FIG. 2 shows a user communication device according to an embodiment of the invention.

FIG. 2 is a block diagram illustrating various components of the verification token 122 according to one embodiment.

The embodiment illustrated in FIG. 2 is a USB device that includes a USB connectivity module 230, a secure element 220 (e.g., a smart card chip), a wireless/contactless reader 210 capable of reading card data (payment data) from a portable consumer device, a built in memory 240, a self-installing driver 250, a form fill application 260, a terminal application 270, and a heartbeat application 280. The verification token 122 may also have other features such as a keyboard buffer capability and a unique serial number associated with the verification token. The verification token 122 has no footprint on the user computer 120 with internet connectivity when it is plugged in. These various components and modules on the verification token 122 can be used to implement the methods described in more detail below.

Although FIG. 2 illustrates a verification token 122 as something similar to a USB stick, the verification token 122 may come in other forms. For example, it may be piece of hardware or other module installed into a computer, consumer device, or other devices. For example, in other embodiments, the verification token may be housed in a computer and need not be a device that is physically separated from the computer.

II. Method

A. Generation of a Dynamic Verification Value

In the embodiments of the invention, a dynamic verification value may be generated by the server computer 153 in the IP Gateway 152 and delivered to a user communication device such as the verification token 122 and the mobile device 118. The dynamic verification value may be generated in response to a request from a user communication device before conducting a payment transaction. In some embodiments of the invention, the dynamic verification value may be generated via a function-based algorithm that accepts one or more security values as inputs (which will be described in detail below). When a dynamic verification value is generated, it is sent to one or more user communication devices (e.g. verification token 122 and/or mobile device 118). In some embodiments, a user communication device that receives the dynamic verification value, such as the verification token 122, may be utilized in the process of performing an electronic payment transaction (this process will be described in detail below). In some embodiments, a dynamic verification value may be received by a user communication device (e.g. mobile device) and the user 110 may manually enter the dynamic verification value in a payment page of a website.

Before or after sending the dynamic verification value to a user communication device, the server computer 153 may also send the dynamic verification value to the server computer 155 in the payment processing network 150. In one embodiment, the payment processing network 150 may also contact the IP Gateway 152 to receive the dynamic verification value at any time. A program in the server computer 155 associates the dynamic verification value with a corresponding account number(s) of user 110. The account number(s) of the user 110 may be issued by the issuer 160 for which the payment processing network 150 handles the processing and clearing of electronic payment transactions.

When the user 110 purchases goods or services from the merchant website 130 using the user computer 120, the dynamic verification value is entered in the payment page of the merchant website 130 either automatically via the verification token 122 or manually by the user 110. After it receives transaction details including the payment amount and the dynamic verification value, the merchant website 130 then generates an authorization request message which is sent to the acquirer 140. The acquirer 140 forwards the authorization request message to the payment processing network 150. Upon receipt of the authorization request message, the payment processing network 150 compares the dynamic verification value included in the authorization request message, with the dynamic verification value that was received from the IP Gateway 152 (more specifically, the server computer 153). This is done via the comparison module 158 which runs on the server computer 155. In some embodiments, the server computer 153 is part of an authorization system of the payment processing network 150 that utilizes a number of algorithms and employs a number of programs running on computer systems to verify and authenticate an electronic payment transaction.

The payment processing network 150 determines whether the dynamic verification value that was included in the authorization request message matches the copy that was provided by the IP Gateway 152. In one embodiment, the payment processing network 150 then forwards the authorization request message to the issuer 160 along with an indicator that specifies whether there was a match between the dynamic verification values. In one embodiment, if the dynamic verification values do not match, payment processing network 150 may decline the transaction on behalf of the issuer 160. The issuer 160 or the payment processing network 150 can then generate an authorization response message which indicates whether the transaction is approved or declined. The authorization response message is forwarded to the acquirer 140 and then to the merchant 130.

In some embodiments, the payment processing network 150 may forward the authorization request message to the issuer 160 without comparing the dynamic verification value with the dynamic verification value received from the IP Gateway 152. In some embodiments, the IP Gateway 152 may not send the dynamic verification value to the payment processing network 150. In such embodiments, an issuer secret phrase may be used in generation of the dynamic verification value. The issuer secret phrase advantageously provides the ability for the issuer 160 to independently regenerate and verify the dynamic verification value. This process will be described in detail later with reference to FIG. 5.

Two specific embodiments in which the user 110 may use a user communication device to request and receive a dynamic verification value will now be described. It will be understood by those skilled in the art that other means may be used to request, receive and use the dynamic verification value to conduct an electronic transaction, and that the following descriptions are not indented to be limiting.

Referring to FIG. 1, in an embodiment of the invention, the user 110 may receive a verification token 122 such as the one illustrated in FIG. 2 from his or her financial institution (issuer 160, for example). Alternatively, a user may receive a verification token 122 from another entity on behalf of a financial institution.

The user 110 can then connect the verification token 122 into the USB port of his user computer (user computer 120, for example). The verification token 122 is then powered by the user computer, and it is recognized as a valid device. The verification token 122 can also self-install via the self-installing driver 250 (shown in FIG. 2), and then ping the user computer 120 to check for internet connectivity.

If Internet connectivity is available, the verification token 122 can then automatically attempt to establish a background SSL session to the IP Gateway 152 through a predefined IP address, using the user computer 120, so that it can be used as a part of an authentication process. A terminal application 270 and heartbeat application 280 may be used to establish and maintain this connection. If the session connection is successfully established, the verification token 122 identifies itself to the IP Gateway 152 by providing its unique serial number and/or IP address.

When the user 110 is ready to submit his/her payment information to the merchant website 130, he/she holds the portable consumer device 112 in close proximity of the verification token 122. Card data associated with the portable consumer device 112 are received by the verification token 122 from the contactless element 114 of the portable consumer device 112. The verification token 122 encrypts the card data and sends them to the IP Gateway 152 via the previously established SSL session described above. When the IP Gateway 152 receives the encrypted data, the authenticity of the information is validated by validating the account number associated with the portable consumer device 112. The IP Gateway 152 generates a dynamic verification value based on a predetermined algorithm, and sends the dynamic verification value to the verification token 122. The dynamic verification value is automatically form-filled in the payment page of the merchant website 130 by the form-fill application 260 shown in FIG. 2.

When the dynamic verification value is submitted to the merchant website 130, the merchant website 130 then generates an authorization request message which is sent to the acquirer 140. Acquirer 140 passes the authorization request to the payment processing network 150. Payment processing network 150 compares the dynamic verification value that is in the authorization request message from the acquirer 140 (which is received from the merchant website 130) to the dynamic verification value that is received from the IP Gateway 152. This is performed by the comparison module 158. If they match, the payment processing network 150 sends the authorization request message to the issuer 160. The issuer 160 generates an authorization response message which indicates whether the transaction is approved or declined. The authorization response message is sent to the payment processing network 150 which then sends it to the acquirer 140. The acquirer 140 informs the merchant associated with the merchant website 130 about the result.

In another embodiment, the user 110 requests and receives the dynamic verification value using the mobile device 118. The user 110 then initiates a request by sending an SMS from the mobile device 118 to the IP Gateway 152. When the IP Gateway 152 receives the request, the phone number and the PAN associated with the mobile device 118 are identified. The IP Gateway 152 then validates the account number associated with the portable consumer device 112 and phone number of the mobile device 118. The IP Gateway 152 generates a dynamic verification value, based on a predetermined algorithm, which is sent (via SMS) to the mobile device 118. The generated dynamic verification value is also sent to the payment processing network 150. Then, user 110 enters the dynamic verification value at the payment page of the merchant website 130 along with the payment information to purchase goods or services.

In some embodiments, a request for dynamic verification value may be received by the IP Gateway 152 from other delivery means. For example, the user 110 may send an e-mail message to the IP Gateway 152 with the appropriate information and request for a dynamic verification value for his user computer 120 in the event that the verification token 122 is not used. In another example, a program application running on the user computer 120 or a secure chip embedded in the user computer 120 may send a request to the IP Gateway 152 for a dynamic verification value. Therefore, it will be understood by those skilled in the art that different means for requesting a dynamic verification value may be used.

B. Using Security Values as Input to for the Algorithm that Generates the Dynamic Verification Value.

The IP Gateway 152 may use a variety of algorithms to generate the dynamic verification value. The algorithm that is used to generate the dynamic verification value may accept one or more values and/or parameters and generates a dynamic verification value as a result of processing the values. In some embodiments, a function-based algorithm such as the Secure Hash Algorithm, also referred to as "SHA," is used to generate the dynamic verification value. The hash algorithm can accept multiple security values and generate a dynamic verification value. In some embodiments, a symmetric-key encryption standard such as DES (Data Encryption Standard) or AES (Advanced Encryption Standard) or a asymmetric-key encryption such as PK (Public Key) encryption may be used in addition to or instead of a SHA function. In some embodiments, multiple algorithm standards may be used based on the preference of different issuers or security concerns, for example. Also, the use of a particular type of algorithm may be based on the verification token or the means used to request and incorporate the dynamic verification value into an authorization request message.

Figure 3:
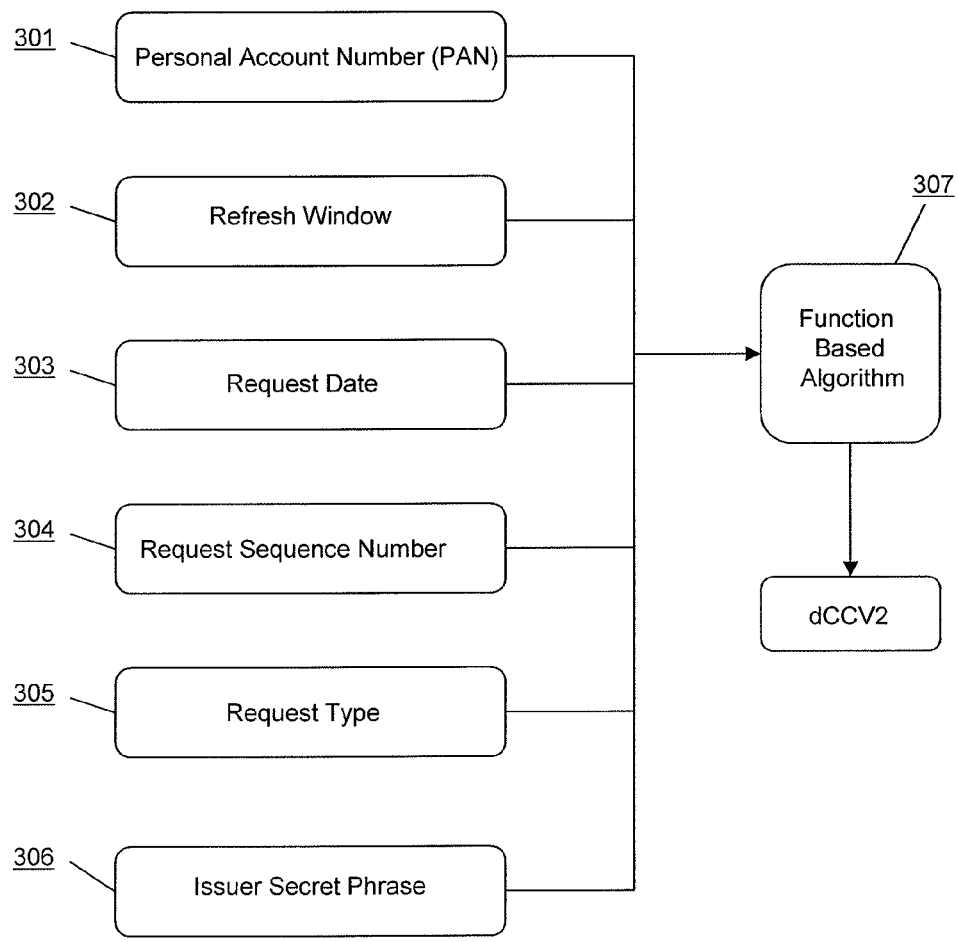
FIG. 3 illustrates a diagram that shows various types of security values used in generation of a dynamic verification value according to an embodiment of the invention.

The combination and types of security values that are used with the Secure Hash Algorithm depends on the level of desired security and complexity, and preference of the issuers. The security values may include any number and combination of numerical values, characters, symbols, parameters, etc., capable of serving as an input to a one-way function-based algorithm (e.g. Secure Hash Algorithm). FIG. 3 illustrates an example of some of the security values any combination of which may be used as an input to a function-based algorithm to generate a dynamic verification value. The security values shown in FIG. 3 include a primary account number (PAN) 301, a refresh window 302, a request date 303, a request sequence number 304, a request type 305, and an issuer secret phrase 306. As shown in FIG. 3, any of these security values can be used inputs for the function-based algorithm 307, which generates a dynamic verification value. For example, the dynamic verification value may be generated from the primary account number (PAN) and the request date on which the request for dynamic verification value was made. In this example, the function-based algorithm may be Secure Hash Algorithm (SHA) and the function-call to the Secure Hash Algorithm (SHA) sends these two security values to be used for the generation of the dynamic verification value (i.e. dCVV2=SHA1(PAN||Request Date)).

In some embodiments, the dynamic verification value may be a 3-digit number (i.e. 24 bits) and may be obtained from choosing any combination of 24 bits of the output of the function-based algorithm, provided that each 8-bits of the 24-bits translates into a numerical value (i.e. 0 to 9). For example, if the output of the function-based algorithm is 128 bits, 24 bits that represent a 3-digit number (e.g. 123) may be chosen from the 128-bits result.

Figure 4:
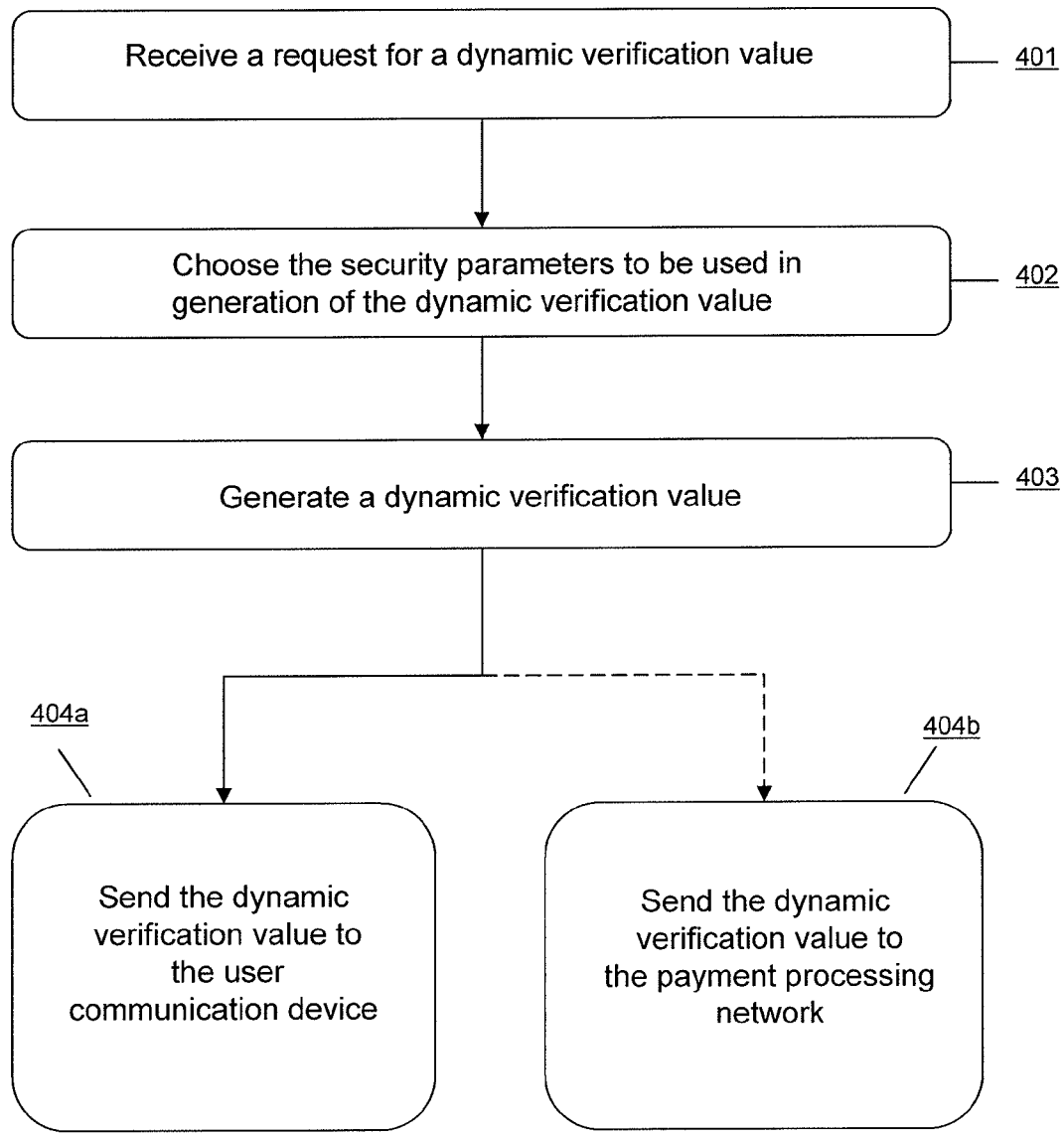
FIG. 4 illustrates a flowchart that shows the steps involved generating a dynamic verification value according to an embodiment of the invention.

FIG. 4 is a flowchart that illustrates the steps involved in generating a dynamic verification value by the IP Gateway 152 (or any other suitable entity). As shown in step 401, IP Gateway 152 receives a request for a dynamic verification value from a user communication device. A program running on the server computer 153 then selects a number of security values to be used in generation of the dynamic verification value (step 402). Examples of such security values are shown in FIG. 3. The security values that are selected are provided to a function-based algorithm and a dynamic verification value is generated (step 403). The IP Gateway 152 then sends the dynamic verification value to the user communication device (step 404a). The IP Gateway may also send the dynamic verification value to the payment processing network 150 (step 404b). The dotted line in FIG. 4 indicates that step 404b may be optional depending on whether the payment processing network 150 validates the dynamic verification value or whether the issuer 160 independently validates the dynamic verification value. Furthermore, as noted above, the IP Gateway 152 may be part of the payment processing network 150 at which time, step 404b may be performed by sending the dynamic verification value to an authorization system in the payment processing network 150.

Each of the exemplary security values shown in FIG. 3 and the advantages of such values will now be described.

The primary account number (PAN) 301 may be any suitable length, but may be typically be 13, 16, or 18 digits. It may be embossed on the portable consumer device 112 (shown in FIG. 1). In some embodiments, a portion of the primary account number (PAN) 301 of the user 110 may be used as an input into the function-based algorithm 307. Using the primary account number (PAN) 301 as an input is advantageous, because it results in a user-specific dynamic verification value.

Refresh window 302 indicates the amount of time for which a generated dynamic verification value remains valid or that a previously generated dynamic verification value may be reused. This parameter may be used as an expiry date for the dynamic verification value.

Request date 303 may be the date on which the request for dynamic verification value is made which may also correspond to the date that the electronic payment transaction takes place. Request date 303 may be in the format "ddmmyy" or may be formatted as a Julian date. The Julian date format is a date format in which a date is calculated from a reference point in time. For example, a Julian date may be calculated from beginning of a calendar year and may include the number of days or minutes or seconds from the reference point. In one example, the request date may be formatted as 10090, where the first two digits indicate the year 2010 and the last three digits indicate the number of days from the beginning of the year 2010, which in this example is the ninetieth day of the year 2010.

Depending on how the date is formatted, it may provide for higher level of customization of the refresh window which is a period of time for which a dynamic verification value remains valid. For example, if the request date is in the form of number of hours from the beginning of a calendar year, the validity period of the dynamic verification value may be designated to a number of hours from the request date. Therefore, it can be appreciated that by choosing a type of Julian date format, the granularity of the date may be adjusted while having more control over the window in which the dynamic verification value remains valid.

For example, the request date maybe in Julian date format and its value may be 2208 which represents the number of hours from beginning of the year 2010. This value translates to Apr. 2, 2010 (2,208 hours from Jan. 1, 2010). Based on this, the value of the refresh window maybe "fine tuned" to 18 hours from the request date. Therefore, when a new request is received by the IP Gateway 152 for a dynamic verification value, the IP Gateway 152 can compare the new request date with the previous request date to determine whether 18 hours has passed since the previous request for a dynamic verification value.

The request sequence number 304 can refer to a value that reflects the number of requests from the user communication device. The request sequence number 304 allows for the generation of a new and unique dynamic verification value for each new request. This value may be provided by the user communication device that submits a request for a dynamic verification value. It can be appreciated that this value may be advantageously used to determine whether the request is being initiated from an authentic user communication device, since a request coming from any device other that the authorized user communication device will have a request sequence number that is out of sync. For example, the request sequence number for a verification token may start from "0001" for a first transaction and sequentially increase for each subsequent transaction. In this example, a verification token that has performed 100 transactions will have the request sequence number of "0100".

The request type 305 (which may also be referred to as a "channel indicator") is an indicator that specifies the channel and/or type of the user communication device that requested the dynamic verification value. By using the request type 305, a separate dynamic verification value may be generated for each of the user communication devices (e.g. the verification token 122, and the mobile device 118) used for requesting a dynamic verification value. The request type 305 may be supplied by the user communication device or may be determined by the IP Gateway 152 by recognizing the type of user communication device that submits a request. For example, a request type "1" may indicate that the request for dynamic verification value is coming from a verification token (e.g. verification token 122 in FIG. 1), while a request type "2" may indicate that the request for dynamic verification value is coming from a mobile device. This is advantageous in that it allows the IP Gateway 152 to generate different sets of dynamic verification values for different user communication devices that may be used by a user to perform an electronic payment transaction. Furthermore, the request type 305 also allows the IP Gateway 152 to use different combinations of security values based on the level of security of the user communication device used to perform an electronic payment transaction. For example, different types and numbers of security values may be used for generating dynamic verification values for verification tokens and mobile devices.

The issuer secret phrase 306 can refer to a unique secret phrase chosen by the issuer 160 or mutually agreed upon between the payment processing network 150 and the issuer 160. The issuer secret phrase 306 may include numbers, characters, symbols or any combination these elements. In some embodiments, the issuer secret phrase 306 may be used by the issuer 160 to independently regenerate the dynamic verification value. In some embodiments, the issuer 160 may prefer to independently generate the dynamic verification value and compare it with the dynamic verification value in the authorization request message that it receives from the payment processing network 150. In some embodiments, the authorization request message may bypass the payment processing network 150 and go to the issuer 160 (i.e. authorization request message delivered via another payment processing network). This becomes problematic if the issuer 160 does not have the means to determine whether the dynamic verification value in the authorization request message is valid or not. Therefore, the IP Gateway 152 may supply the algorithm used to generate the dynamic verification value to the issuer 160. IP Gateway 152 may also use a pre-determined issuer secret phrase to generate the dynamic verification value. In the event that the issuer 160 wants to independently verify the dynamic verification value, it can use the algorithm to regenerate the same exact dynamic verification value that is in an authorization request message.

In some embodiments, issuer secret phrase 306 may be used with some of the security values that are not available to the issuer 160 or that cannot be extracted or derived from the data embedded into the authorization request message. In such embodiments, other security values may be supplied to the issuer 160 by the IP Gateway 152 so that the issuer 160 can independently verify the dynamic verification value.

Figure 5:
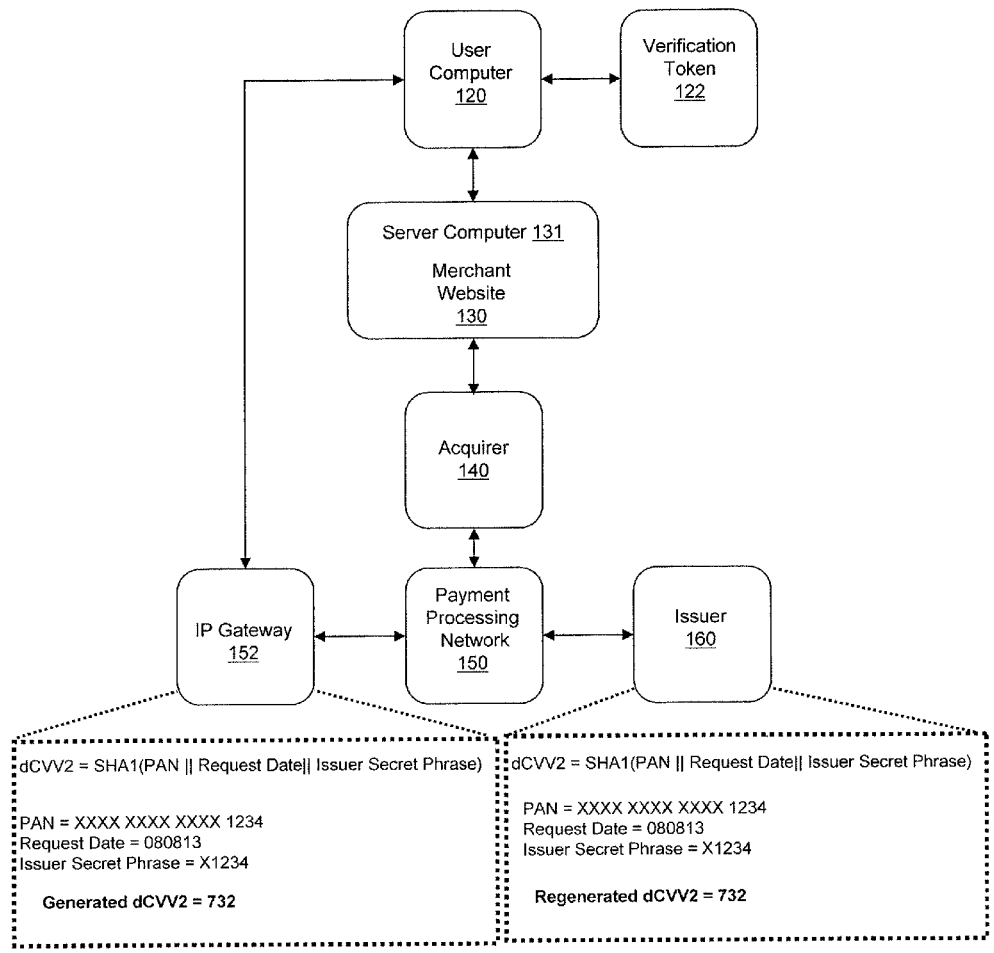
FIG. 5 shows a system according to an embodiment of the invention.

FIG. 5 is a block diagram that illustrates an example of an embodiment in which the issuer 160 independently verifies the dynamic verification value by regenerating the same exact value included in an authorization request message. In FIG. 5, the IP Gateway 152 generates a dynamic verification value by using the Secure Hash Algorithm (SHA1). The IP Gateway 152 sends three security values (PAN, request date, and issuer secret phrase) to SHA1 and a dynamic verification value is generated. When this dynamic verification value is sent to the user computer 120, it is form-filled into the merchant website 130, and as a result, an authorization request message is sent from merchant website 130 to the acquirer 140. The authorization request message is then sent to the issuer 160 through payment processing network 150.

In the example shown in FIG. 5, the issuer 160 has access to the same algorithm used by the IP Gateway 152 to generate the dynamic verification value. Therefore, by knowing the issuer secret phrase, the issuer 160 is able to regenerate the same exact dynamic verification value by extracting the PAN and request date from the authorization request message, and supplying these values along with the issuer secret phrase to the algorithm (SHA1). In some embodiments, the issuer 160 may communicate with the entity that generates the dynamic verification value (i.e. IP Gateway 152) to verify the dynamic verification value that it receives in a payment transaction.

It can be appreciated that the use of additional security values may provide many advantages. For example, by combining the security values in certain order the level of complexity of the dynamic verification value can be adjusted. For example, the combination of the primary account number (PAN) 301 and the request date 303 results in generation of a one unique dynamic verification value per day. By adding the request sequence number 304, the number of unique dynamic verification values are increased to one per each request (i.e. one per each transaction). By adding the refresh window 302 the amount of time that each unique dynamic verification value remains valid is controlled. By adding the request type 305 to the mix, each user communication device receives a unique dynamic verification value for each transaction.

Furthermore, the issuer secret phrase 306 is particularly advantageous since it allows the issuers to independently regenerate and validate the dynamic verification value. Also, the issuer secret phrase 306 results in a unique dynamic verification value for each issuer. It can be appreciated that issuers can advantageously utilize the issuer secret phrase 306 to add another layer of security to the dynamic verification value by periodically revising the issuer secret phrase and/or by designating different issuer secret phrases for different types of accounts. Moreover, the issuer secret phrase 306 can be localized per multiple regions. For example, issuer 306 may decide to use "1234" as the issuer secret phrase for the transactions originating from one geographical region of the country while using "5678" as the issuer secret phrase for transaction originating from another geographical region of the country.

Figure 6:
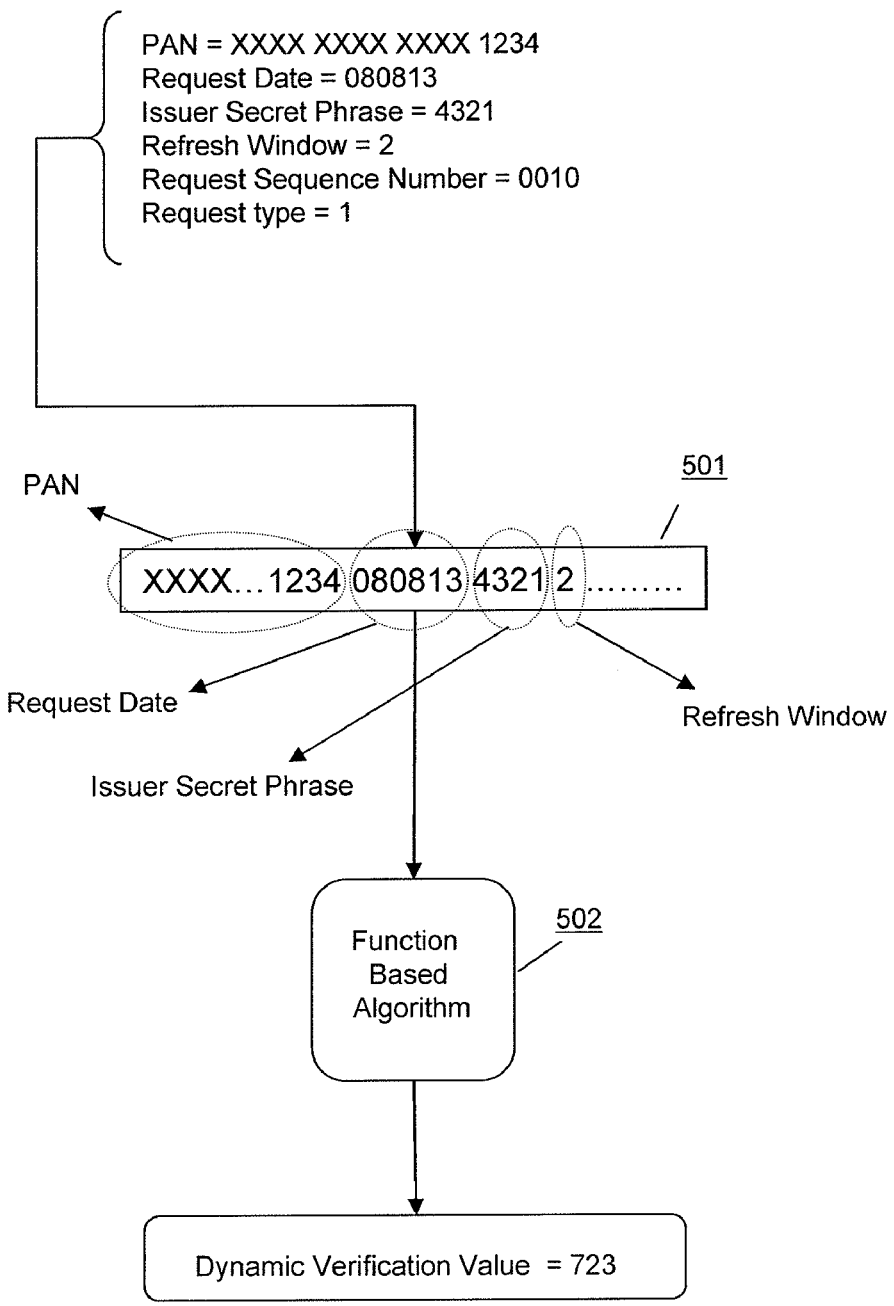
FIG. 6 illustrates a diagram that shows one example of types of security values used in generation of a dynamic verification value according to an embodiment of the invention.

FIG. 6 illustrates one example of the types of security values used to generate a dynamic verification value. As shown in FIG. 6, a primary account number associated with a portable consumer device is "XXXX XXXX XXXX 1234" which is used to perform an electronic payment transaction. As shown in FIG. 6, the request date for this transaction is "080813" which is Aug. 8, 2013. The dynamic verification value that will be generated will be valid for two days as indicated by the refresh window value which is "2". The request for dynamic verification value is coming from a verification token as indicated by the request type "1", and this is the tenth request from the verification token as indicated by the request sequence number "0010". An issuer secret phrase "4321" will also be used to generate the dynamic verification value. As shown in FIG. 6, all of the above security values form an input 501 for the function-based algorithm 502. The function-based algorithm 502 then generates a dynamic verification value "723" as a result of processing the input 501. This dynamic verification value is then sent to a verification token and it is used to perform an electronic payment transaction.

In some embodiments, other types of security parameters may be used to generate a dynamic verification value. In some embodiments, data that are specific to the payment transaction may be used to further increase the security level. For example, the merchant reference number, transaction amount or the SKU (Stock-keeping Unit) may be used as a security parameter in the algorithm that generates the dynamic verification value.

It can be appreciated that the embodiments of this novel invention are additionally advantageous in that they provide the issuers with an spectrum of customization features from completely outsourcing the authentication and/or validation of the authorization request messages to independently use the function-based algorithm utilized by the IP Gateway 152 to regenerate the dynamic verification value and validate the authorization request message. The IP Gateway 152 is also able to advantageously use the dynamic verification value to provide more security for the electronic payment transactions while accommodating the preferences of the other entities involved in the processing of the electronic payment transactions.

Figure 7:
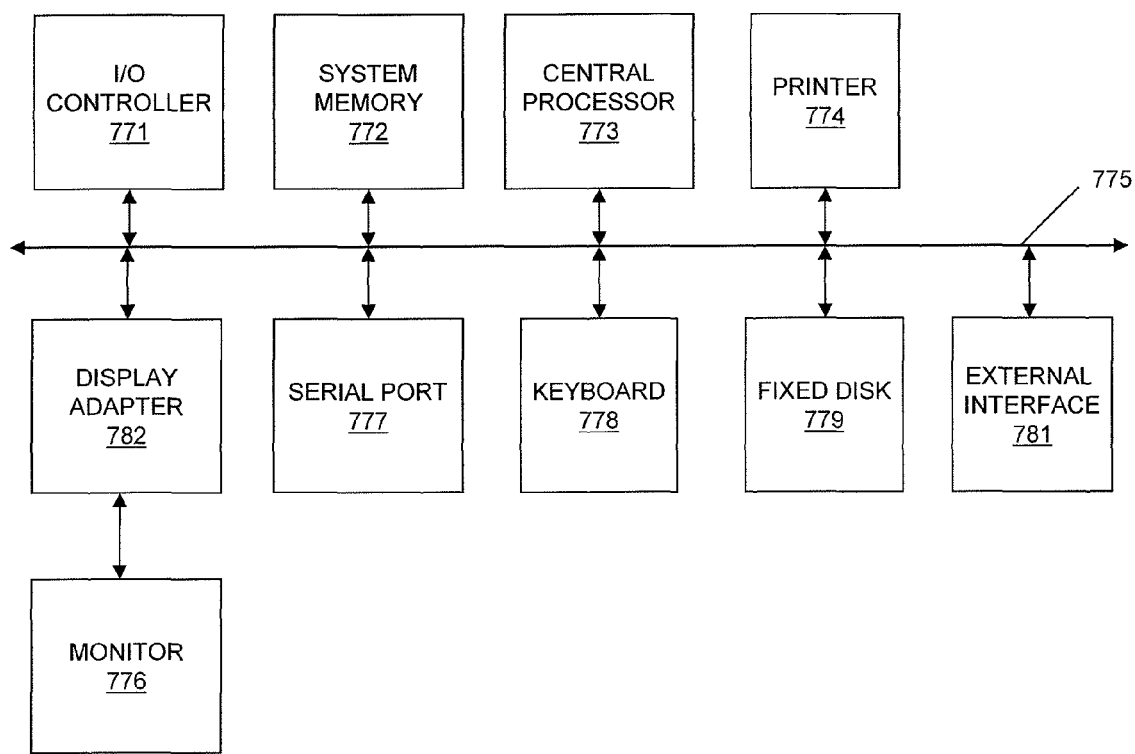
FIG. 7 shows a system according to an embodiment of the invention.

The various participants and elements of the system shown in FIG. 1 may operate one or more computer apparatuses to facilitate the functions described herein. Any of the elements in FIG. 1 may use any suitable number of subsystems to facilitate the functions described herein. Examples of such subsystems or components are shown in FIG. 7. The subsystems shown in FIG. 7 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771, can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems.

The system memory 772 and/or the fixed disk 779 may embody a computer readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

In embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method comprising:
   selecting a set of security values comprising an issuer secret phrase from a plurality of security values, using a server computer, wherein the issuer secret phrase provides an ability for an issuer to independently regenerate and verify a dynamic verification value;
   generating the dynamic verification value using a function-based algorithm and the set of security values, using the server computer; and
   sending the dynamic verification value to a user communication device, using the server computer, wherein the dynamic verification value is used as part of an authorization request message for performing an electronic payment transaction.

2. The method of claim 1, further comprising:
   sending the dynamic verification value to a server computer, wherein the server computer dynamic verification value to an authorization system of a payment processing network.

3. The method of claim 1, wherein by selecting the set of security values from the plurality of the security values, a unique security characteristic for the dynamic verification value is obtained.

4. The method of claim 1, wherein by selecting the set of security values from the plurality of the security values, level of complexity of the dynamic verification values is adjusted.

5. The method of claim 1, wherein the function-based algorithm is a one-way function-based algorithm capable of accepting the plurality of security values as input.

6. The method of claim 1, wherein the dynamic verification value is a 3-digit numerical value.

7. The method of claim 1, further comprising:
   receiving a request for a dynamic verification value at a server computer from a user communication device configured to communicate with the server computer through a network connection.

8. The method of claim 7, wherein the user communication device is a verification token capable of being coupled to a personal computer.

9. The method of claim 7, wherein the user communication device is a mobile phone.

10. The method of claim 1, wherein the plurality of security values are chosen from any one of a primary account number (PAN), a refresh window, a request date, a request sequence number, a request type, and the issuer secret phrase.

11. The method of claim 10, wherein the refresh window indicates an amount of time for which a generated dynamic verification value remains valid.

12. The method of claim 10, wherein the request date is a date on which a request for dynamic verification value is made.

13. The method of claim 10, wherein the request sequence number is a value that reflects a number of requests from the user communication device.

14. The method of claim 10, wherein the request type is an indicator that specifies a type of the user communication device that requested the dynamic verification value.

15. The method of claim 10, wherein the refresh window indicates the amount of time for which a previously generated dynamic verification value may be reused.

16. The method of claim 10, wherein the request date is in a Julian date format.

17. The method of claim 10, wherein a separate dynamic verification value may be generated for each of the user communication devices using the request type.

18. The method of claim 10, wherein the complexity of the verification value is adjusted based on the type of the user communication device.

19. The method of claim 1, wherein a first issuer is able to issue a first issuer secret phrase which results in a first dynamic verification value, and wherein a second issuer is able to issue a second issuer secret phrase which results in a second dynamic verification value, and wherein the first dynamic verification value is different from the second dynamic verification value.

20. A system comprising:
   a computer readable storage medium;
   a processor coupled to the computer readable storage medium, wherein the processor is configured to execute program code stored on the computer readable storage medium to:
   select a set of security values comprising an issuer secret phrase from a plurality of security values, wherein the issuer secret phrase provides an ability for an issuer to independently regenerate and verify a dynamic verification value;
   generate the dynamic verification value using a function-based algorithm, wherein the function-based algorithm is stored on the computer readable storage medium; and
   send the dynamic verification value to a user communication device through a secure network connection.

21. The system of claim 20, wherein the processor is further configured to execute program code stored on the computer readable storage medium to send the dynamic verification value to an authorization system of a payment processing network.

22. The system of claim 20, wherein the processor is further configured to execute program code stored on the computer readable storage medium to receive a request for a dynamic verification value from the user communication device through a secured network connection.

23. The system of claim 20, wherein the plurality of security values are chosen from any one of a primary account number (PAN), a refresh window, a request date, a request sequence number, a request type, and the issuer secret phrase.

24. A method comprising:
receiving an authorization request message, using a computer system comprising a processor and memory; and
regenerating a dynamic verification value accompanying the authorization request message by using a function-based algorithm and an issuer secret phrase, using the processor, wherein the dynamic verification value accompanying the authorization request message is generated by: selecting a set of security values comprising the issuer secret phrase from a plurality of security values wherein the issuer secret phrase provides an ability for an issuer to independently regenerate and verify a dynamic verification value; generating the dynamic verification value using a function-based algorithm and the set of security values; and sending the dynamic verification value to a user communication device, wherein the dynamic verification value is used as part of an authorization request message for performing an electronic payment transaction.

25. The method of claim 24, wherein the dynamic verification value is generated by a server computer in communication with a payment processing network and supplied to a user communication device so that the dynamic verification value is embedded in the authorization request message.

26. The method of claim 24, further comprising:
determining whether the authorization request message is originated from an authorized source.

* * * * *